(12) United States Patent
Tailhades et al.

(10) Patent No.: US 6,464,750 B1
(45) Date of Patent: Oct. 15, 2002

(54) METHOD OF PREPARING METAL POWDERS, METAL POWDERS PREPARED IN THIS WAY AND COMPACTS THAT INCLUDE THESE POWDERS

(75) Inventors: Philippe Tailhades, Saint-Orens-de-Gameville; Valérie Carles, Pinsaguel; Abel Rousset, Ramonville St Agne, all of (FR)

(73) Assignees: ASB Aerospatiale Batteries, Bourges (FR); Universite Paul Sabatier, Toulouse Cedex (FR)

( * ) Notice: Subject to any disclaimer, the term of this patent is extended or adjusted under 35 U.S.C. 154(b) by 0 days.

(21) Appl. No.: 09/592,440

(22) Filed: Jun. 12, 2000

(30) Foreign Application Priority Data

Jun. 10, 1999 (FR) .............................................. 99 07340

(51) Int. Cl.⁷ .................................................. C22C 1/04
(52) U.S. Cl. ............................. 75/246; 75/245; 75/255; 75/348; 75/351; 75/369
(58) Field of Search .......................... 75/348, 351, 369, 75/255, 245, 246

(56) References Cited

U.S. PATENT DOCUMENTS

| | | | |
|---|---|---|---|
| 3,855,016 A | * 12/1974 | Ehrreich et al. | ............ 148/311 |
| 3,909,240 A | * 9/1975 | Deffeyes et al. | ............... 75/348 |
| 3,955,961 A | 5/1976 | Jordan | |
| 3,965,046 A | * 6/1976 | Deffeyes et al. | ............ 502/337 |
| 3,994,819 A | 11/1976 | Mollard et al. | |
| 4,004,917 A | * 1/1977 | Deffeyes et al. | ............. 428/435 |
| 4,061,824 A | * 12/1977 | Deffeyes et al. | ............. 428/328 |
| 4,268,302 A | * 5/1981 | Deffeyes et al. | ............. 502/337 |
| 4,414,021 A | 11/1983 | Welbon | |
| 4,803,291 A | * 2/1989 | Rousset et al. | ................ 556/31 |

FOREIGN PATENT DOCUMENTS

| | | |
|---|---|---|
| FR | 2 278 669 | 9/1974 |
| FR | 2 587 989 | 9/1985 |

* cited by examiner

*Primary Examiner*—Ngoclan Mai
(74) *Attorney, Agent, or Firm*—Burns, Doane, Swecker & Mathis, L.L.P.

(57) ABSTRACT

The invention relates to a method of preparing metal powder comprising: preparing a simple or mixed oxalate of one or more metals formed of particles with needle-like morphology having a mean acicularity ratio (length/diameter) of from 4 to 20, and a length of from 5 to 10 microns and converting said oxalate to metal or metal alloy powder by reducing treatment with gaseous hydrogen. The conversion of said oxalate can be carried out by decomposing said oxalate, in air, to an oxide and then reducing said oxide to metal or metal alloy. The metal is chosen from among the rare earth metals and the transition metals, preferably from among iron, cobalt, and nickel. The method is particularly suitable for making iron powder metal having a spongy and filament-like microstructure which makes it suitable for use in heating composition for thermo-piles. In addition, the invention relates to metal compacts unstoved or annealed which are obtained by applying compaction pressure to the powders according to the invention.

60 Claims, 4 Drawing Sheets

METHOD OF PREPARING METAL POWDERS, METAL POWDERS PREPARED IN THIS WAY AND COMPACTS THAT INCLUDE THESE POWDERS

DESCRIPTION

The invention relates to a method of preparing metal powders, particularly iron powder.

The term "metal powder" covers both pure metal powders and powders of metal alloys.

More precisely, the invention is concerned with a method of preparing metal powders, in particular, iron powder by thermal reduction of transition metal or rare earth metal oxalates or oxides that result from the decomposition of transition metal or rare earth metal oxalates, for example, iron oxalates or iron oxides resulting from iron oxalates, these oxalates or oxides being constituted by particles with needle-like morphology having a size, more precisely a length that is specific.

The metal powder, for example the prepared iron powder has a spongy and filament-like structure that equals or indeed exceeds the specifications current for such a metal powder, for example such an iron powder, which makes it particularly suitable for numerous uses, in particular, for use in heating compositions for thermo-piles, when they make use of iron powder.

In addition, the invention relates to metal compacts, unstoved or annealed, obtained by application of compacting pressure to the metal powders according to the invention, possibly accompanied by partial sintering.

The invention relates to numerous applications or uses that require the use through pressing of one or more metal powders, pure or alloyed, which may or may not be associated later with other components enclosed in the porosity of the compact.

Among these applications or uses, one may mention, for example, the manufacture of pyrotechnic mixtures comprising iron powder according to the invention and an oxidizing agent, porous electrodes used notably in electrical energy accumulators, such as electro-chemical Ni—Cd cells or Ni-metal hydride cells etc., soft or hard magnetic materials, such as armatures for electric motors, and permanent magnets, catalyst supports, in which a catalytic powder is enclosed within a porous metal structure, filters that are able to make use of the ferro-magnetic properties of certain metals for magnetic separation and, more generally, mechanical components of complex shape which can be produced by a simple pressing operation, avoiding having to carry out complicated machining operations.

The technological field of the invention can therefore be defined as that of metal powders and their preparation, as well as unstoved or annealed metal compacts prepared by pressing these powders, this pressing operation being possibly accompanied by partial sintering.

Such compacts find uses in numerous sectors of industry, in which they must have high mechanical strength.

The compacts prepared from known metal powders have mechanical strengths that are markedly inadequate.

In a preferred manner, which is non-limitative, the invention is more particularly set in the field of thermo-piles.

In particular, the invention relates to a heating pyrotechnic composition comprising the metal powder, in particular iron powder, according to the invention, as well as the thermo-pile comprising this heating pyrotechnic composition.

Thermo-piles are non-rechargeable cells, inert before initiation, which can be stored without any maintenance, sometimes for more than 20 years while remaining usable at any time, with a response time that can be less than three tenths of a second.

Thermo-piles find increasing use in all fields where there is a need for immediately available energy, in a reliable manner, even after a very long storage time.

Thermo-piles are thus mainly used in the aeronautics and space industries and also in all emergency services that require such a source of energy for example, in the nuclear industry, the oil industry and commercial and warehousing buildings etc.

A compacted composition of iron/potassium perchlorate is the traditional heating pyrotechnic composition for thermo-piles.

In effect, this composition has shown a clear superiority in comparison with so-called "paper" zirconium/barium chromate used in the past as a heating pyrotechnic composition for thermo-piles.

The performance of these thermo-piles is directly linked to the properties of this composition and in particular to the microstructure of the iron powder.

The iron powder most commonly used up to now in iron/potassium perchlorate heating compositions for thermo-piles is the powder sold under the name of NX-1000 powder by the Company PFIZER METAL and Composite Products of Walkingford Connecticut, USA or by the Company AMETEKO Specialty Metal Products Division.

This iron powder meets all the following specifications which an iron powder for thermo-piles must fulfill: a sponge-like structure, a total iron content greater than 95%, an elemental iron content greater than 89%, a specific surface Sw ($m^2/g$) greater than 0.5 $m^2/g$, a loss with hydrogen less than 3%, a Scott density of from 0.8 to 1.15, a Fischer sub-granulometry of from 1.5 to 3.5 $\mu$m, a granulometry in which more than 70% of the particles pass a sieve with a 44 $\mu$m opening and less than 1% of the particles are retained on a sieve with a 150 $\mu$m opening, a "Green force" or compact resistance (determined in accordance with standard ASTM B312-56T) greater than 35 MPa for a forming pressure of 276 MPa.

Numerous methods have been described in the literature to prepare iron powder, but none of these methods permits the preparation of iron powder that can be used in pyrotechnic heating compositions for thermo-piles and that can meet the specifications given above.

Document U.S. Pat. No. 4,414,021 relates to a method of preparing iron powder suitable for use in iron-potassium perchlorate pyrotechnic heating mixtures for thermo-piles.

This method comprises the preparation of a homogeneous dense precipitate of iron hydroxide by precipitation from an aqueous solution of a ferric salt, formic and sulfuric acids, ammonium hydroxide and urea as precipitation agent.

The dense precipitate obtained is then reduced by hydrogen at 650 to 900° C. for 0.5 to 2 hours to prepare the iron powder which has a spongy structure and which meets the specifications given above.

The precipitate obtained in the first stage of the method is an iron oxyhydroxide which generally has a formula FeOOH. In effect, if ferric sulfate is used in the aqueous solution, the salt formed is $Fe_3(SO_4)_2(OH)_5 \cdot 2H_2O$ which subsequently gives an iron powder having a sulfur content that is excessive for use in a thermo-pile.

The shape and the morphology of the powder produced from the precipitate has not been made clear.

In example 5, this document studies the reduction of various iron based compounds by hydrogen.

Among the twelve compounds tested in fifty tests, only five, following reduction by hydrogen, gave iron powders suitable for use in a thermo-pile, that is to say, powders having properties equivalent to iron powder NX-1000 from PFIZER® (AMETEK®). Apart from the precipitates already mentioned, these compounds are various ferric nitrates and oxides.

Ferrous oxalate, the morphology of which is not described, has also been subjected to reduction by hydrogen, in four different tests. This compound gives an iron powder with a spongy structure, but according to the inventors, this iron powder prepared from ferrous oxalate is not suitable for use in a thermo-pile and is not analogous to the NX-1000 powder from PFIZER® (AMETEK®).

The method described in the document U.S. Pat. No. 4,414,021, though it apparently enables one to prepare an iron powder that meets the specifications given above, still has numerous disadvantages, for example, since no specification is given concerning the morphology of "good" precursors, no controls on them can be carried out before the reduction stage, which can lead to random results in relation to the properties of the iron powders produced according to the method of document U.S. Pat. No. 4,414,021.

Similarly, as has already been mentioned above, in the more general case of the preparation of metal powders, the metal powders prepared at present by the known methods give, when pressed, compacts, the strength or mechanical resistance of which is markedly inadequate for most applications.

Therefore there is an unsatisfied need for a method that permits the preparation of a metal powder which through the pressing of compacts, gives improved resistance or mechanical strength, the other properties of such a powder additionally being within satisfactory ranges.

More precisely, there is an unsatisfied need for a method that permits the preparation of iron powder that meets at least the specifications given above and is suitable as a constituent of pyrotechnic heating compositions.

In addition, there exists a need for a method that permits the preparation of such a metal powder at high yield. This method must finally be reliable, reproducible, easy to carry out, include a limited number of steps and permit the preparation within a short period of time of large quantities of metal powder, for example, iron powder.

The object of the invention is to provide a method of preparation of a metal powder, in particular, an iron powder, that responds to the group of needs, among others, given above for such a method.

The object of the invention is also to provide a method that does not have the drawbacks, disadvantages and limitations of the methods of the prior art and which resolves the problems posed by these methods.

This object and others, are achieved, conforming to the invention, by a method of preparing a metal powder or a metal alloy powder comprising the following steps:
preparation of a simple or mixed oxalate of one or more metals made up of particles with a needle-like morphology, the mean acicularity ratio (length/diameter) being between 4 and 20, and the length from 5 to 10 $\mu$m.
reduction of said metal oxalate by treatment with gaseous hydrogen.

According to a variant of the method of the invention, in the second stage, instead of proceeding with the reduction of the metal oxalate by treatment with gaseous hydrogen, the decomposition of said oxalate to an oxide takes place in air. Then reduction of said oxide is carried out to obtain the metal or metal alloy powder that is sought.

The decomposition in air is, in this case, generally carried out at a temperature of from 250° C. to 600° C.

The metal is chosen preferably from among the transition metals and the rare earth metals.

Preferably, the metal is chosen from among iron, cobalt, nickel, . . . .

The method according to the invention is particularly suitable for the preparation of iron powders. In this case the metal oxalate is ferrous oxalate.

The gaseous hydrogen may be pure or gaseous hydrogen or gaseous hydrogen diluted in a neutral gas, such as nitrogen.

Because of the specific morphology of the oxalate precursor, it's specific size (length), and, in addition, the specific reduction conditions, a metal powder is obtained that meets the needs given above, and in particular, an iron powder which has a spongy and filament-like microstructure which makes it suitable for use in a thermo-pile.

On the other hand, the iron powder prepared by the method of the invention fulfills the conditions and specifications for such an iron powder and is even shown to be superior in most of its characteristics and properties to the known powder sold by the company PFIZER® (AMETEK®) under the name NX-1000.

In a general way, the particles of metal powders prepared by the method of the invention have, in a surprising manner, the property of coming together to form a coherent porous solid with high mechanical strength, under the effect of compacting pressure.

This property results from the entanglement of the particles with a spongy and filament-like structure, that is characteristic of the powders which are a subject of this invention.

Hence, by way of example, if the mechanical resistance of the compacts pressed under given conditions, for example 292 MPa, is measured by the well-known three-point bending test, on parallelepiped test pieces of standardized dimensions, it is possible to evaluate the effect of the morphology of the particles on this mechanical property.

It can then be shown that, for pure iron powders, test pieces produced by pressing spherical or polygonal particles with smooth surfaces rupture at pressures of from 10 to 15 MPa, while if the pressed particles have a spongy and filament-like structure, characteristic of the invention, they can resist more than 50 or indeed 60 MPa.

Advantageously, the metal oxalate, for example, ferrous oxalate made up of particles with a needle-like morphology with an acicularity ratio between 4 and 20, and a length of from 5 to 10 $\mu$m, is produced by mixing a solution of a metal salt, for example, a ferrous salt and a solution of an oxalic compound, and precipitating the metal oxalate, for example, ferrous oxalate from said mixture.

The preparation of the metal oxalate, for example, ferrous oxalate is carried out by a precipitation that is easy to carry out with readily available starting products which are of moderate cost.

Advantageously, the reduction of the metal oxalate, for example, the prepared ferrous oxalate, is carried out by treatment with gaseous hydrogen at a moderate temperature.

It has been shown that a temperature of from 500 to 700° C., preferably from 520 to 620° C., is particularly suitable.

Another subject of the invention is the metal powder, in particular the iron powder, made up of spongy and filament-like particles capable of being obtained by the method described above.

Preferably, said particles have a size between 10 and 50 µm.

Another subject of the invention, is a new product, which is an iron powder with a spongy and filament-like microstructure which has the following properties:

total iron content: greater than or equal to 98%;
    elemental iron content: greater than or equal to 95.7%;
    loss with hydrogen: less than or equal to 1.30%;
    specific surface: greater than or equal to 0.50 $m^2/g$;
        sub Fischer granulometry: 3.25 to 3.5 µm
        granulometry obtained by sieving
    more than 70% of particles having a size less than 45 µm;
    less than 1% of particles with a size greater than 150 µm
    Green force (resistance of the raw compact) for a forming pressure of 276 MPa: greater or equal to 50 MPa.

The iron powder according to the invention conforms to and broadly goes beyond the specifications mentioned above and is superior to the powder NX 1000 AMETEK®, notably with regard to its elemental iron content, the loss with hydrogen, and the green force.

The iron powder according to the invention can be used in numerous fields of industry.

Depending on the use, it can be used alone, as it is, or it can be mixed with other constituents to form a composition.

In addition, the invention relates to compacts capable of being obtained by pressing at least one metal or alloy powder according to the invention.

It has already been mentioned above that these compacts, because of the specific structure of the powder according to the invention, have remarkably improved mechanical strength properties.

These compacts are capable of being obtained by pressing a single pure metal powder or an alloy powder or by pressing several powders, each of these powders being a pure metal powder or an alloy powder.

One or more additional compounds can be additionally added to said pure metal or alloy powder or powders, these compounds then being enclosed within the porosity of the compact; these compounds may be, for example, solids or liquids. Among these compounds, one may mention, for example, ceramics, ionic compounds, hydrides, oxides, ferro-magnetic metals, hydroxides, aliphatic or cyclic organic liquid compounds.

The pressing, carried out for the purpose of obtaining the compacts according to the invention, is generally carried out at a pressure, referred to as the compaction pressure, of from 50 to 500 MPa, preferably, from 100 to 300 MPa.

However, it has been demonstrated that, according to the invention, the mechanical strength (R) of the compacts according to the invention—which is already much higher than that of compacts prepared from powders of the prior art—could be further significantly improved by using higher compacting pressures, namely a compacting pressure of from 500 to 1000 MPa, and/or by additionally carrying out a partial sintering during or after the pressing operation.

This sintering is preferably a sintering carried out under a reducing atmosphere, for example, an atmosphere made up of hydrogen, nitrogen monoxide, or a hydrogen-nitrogen mixture, or under a neutral atmosphere, for example, an atmosphere of nitrogen, a noble gas, such as argon or one of their mixtures.

The partial sintering is generally carried out at a moderate temperature, for example between 400 and 600° C., which only very slightly modifies the porosity of the compacts and enables one to preserve, if necessary, a porosity, for example, greater than 30%, while increasing the mechanical strength.

By way of example, the pressing at 500 MPa of iron powders prepared by the method of the invention gives compacts whose mechanical strength reaches 100 MPa.

Furthermore, a compact for which R is equal to 60 MPa sees its mechanical strength increased to 220 MPa, after partial sintering carried out at 450° C. under pure hydrogen.

The powder according to the invention and the compacts according to the invention find uses in numerous fields of technology as has already been mentioned above.

The invention also relates to the use of the powders or of the compacts described above.

The invention thus relates to the use of the metal powder according to the invention to prepare soft or hard ferromagnetic materials, in particular, filters using the ferromagnetic properties of one or more metals to carry out ferro-magnetic separations, or to manufacture the armatures for electric motors intended for the automobile and domestic electrical appliance sectors, or to produce permanent magnets.

In these applications, the metal powder is generally chosen from among the ferro-magnetic metal powders, such as iron, cobalt, nickel and their alloys.

The invention also deals with the use of the metal powder according to the invention to prepare porous electrodes, notably used for electrical energy accumulators, such as nickel-cadmium electrochemical cells, or nickel-metal hydride cells.

The invention also relates to the use of the metal powder according to the invention to prepare catalyst supports, in which a catalyst powder is enclosed within the porous metal structure.

In the general way, the invention relates to the use of the metal powder according to the invention to prepare mechanical components of complex shape, which may be produced by a simple pressing operation, avoiding complex machining operations.

In other words, the invention relates to the use of metal powders according to the invention in powder metallurgy.

A preferred use of the metal powders according to the invention and in particular iron powder is use in heating pyrotechnic compositions particularly for thermo-piles.

Therefore, the invention also relates to a heating pyrotechnic composition that includes the iron powder according to the invention.

In such a composition, the iron powder is generally associated with a powerful oxidizing agent chosen from among for example potassium perchlorate, lead dioxide, tungsten oxide, iron oxide etc., in a proportion by weight of from 80 to 88% of iron powder to 12 to 20% of oxidizing agent.

In the case of pyrotechnic compositions for thermo-piles, the oxidizing agent is generally potassium perchlorate and the preferred compositions by weight are generally the following:

84% iron powder and 16% $KClO_4$;
    83% iron powder and 17% $KClO_4$.

In order to be used in a thermo-pile, this heating pyrotechnic composition is generally pressed, "tabletted" or conpacted so as to obtain tablets the apparent density of which is preferably from 3.2 to 3.8.

The invention is also concerned with such tablets.

Finally, the invention also relates to a thermo-pile which includes a tabletted heating pyrotechnic composition or tablets as described above.

BRIEF DESCRIPTION OF THE DRAWINGS

The invention will now be described in detail making reference to the attached drawings.

In a detailed way, the method according to the invention comprises, in a first step, the preparation of a metal oxalate, for example ferrous oxalate dihydrate made up of particles with a needle-like morphology and a size of from 5 to 10 µm.

By the size of needle-like particles one generally understands the measurement of their greatest dimension or "length". This length is generally determined from statistical measurements on electron microscope images. Furthermore, the needles should preferably have an acicularity ratio (length/diameter) of from 4 to 20, and preferably close to 10.

According to the invention, the metal oxalate particles, for example ferrous oxalate particles, preferably ferrous oxalate dihydrate particles having such a morphology and such a specific size are prepared by precipitation from a solution obtained by mixing a solution of a metal salt, for example, a ferrous salt and a solution of an oxalic compound.

The metal salt, for example, the ferrous salt used is preferably a chloride of this metal, for example ferrous chloride tetrahydrate $FeCl_2, 4H_2O$, but other metal salts, for example other ferrous salts could be envisaged, for example the sulfate or Mohr's salt.

The solution of this metal salt, for example, a ferrous salt, is generally a solution in a solvent chosen from among water, simple alcohols having from 1 to 4 carbon atoms such as ethanol and isopropanol, polyols, for example, glycerol, ethylene glycol and propane-1,2-diol and their mixtures.

Among these mixtures, one may mention water-ethanol, water-ethanol-isopropanol or water-ethylene glycol mixtures in the following preferred proportions: water 50%, ethanol 50%; water 60%, ethanol 10%, isopropanol 30%; or water 60%, ethylene glycol 40%.

The concentration of the metal salt, for example, the ferrous salt, is such that the concentration of metal salt, for example the ferrous salt, in the mixture is generally from 0.5 to 2 mol./l.

The oxalic compound used is preferably a dihydrate complex of oxalic acid of formula $H_2C_2O_4, 2H_2O$ but other compounds can also be suitable: for example, ammonium oxalate.

The solution of this oxalic compound is generally a solution in a solvent analogous to that already mentioned above.

The concentration of the oxalic compound is such that the concentration of oxalic compound in the mixture is generally from 0.2 to 2 mol./l.

Precipitation is generally carried out at a temperature close to ambient temperature, that is to say, generally between 15 and 30° C., for example, at a temperature close to 20° C.

After the precipitation itself, the metal oxalate, for example, the precipitated ferrous oxalate is generally additionally subjected to a series of operations of maturation, separation, washing, drying and possibly sieving.

Following the precipitation, generally there is a maturing of the metal oxalate, for example, the ferrous oxalate, for a period of from 15 minutes to 1 hour at a temperature close to ambient temperature.

The precipitate is then separated by any known liquid-solid separation operation, such as, for example, by filtration or by centrifugation.

The precipitate obtained is then generally washed, for example, with demineralized water.

The washed precipitate is then generally dried, for example, by heating or by atomization at a temperature of from 40 to 90° C. to bring it to an adsorbed water content close to 0.

This metal oxalate, for example, this dry ferrous oxalate, is then possibly subjected to a sieving operation that enables the powder to be broken down if it does not have the desired size.

The metal oxalate, for example the ferrous oxalate obtained under these conditions has particles with a needle-like morphology and a size (length) of from 5 to 10 µm.

For example, in the case of iron, these are particles of $FeC_2O_4, 2H_2O$.

Numerous oxalate precursors with different morphologies and/or various sizes have been synthesized, but it has proved to be the case that, in a surprising way, the metal oxalate powders, for example, ferrous oxalate having a specific morphology with needle-shaped particles, and more particularly, a specific size (length) of from 5 to 10 µm, and an acicularity ratio of from 4 to 20, are capable of yielding, on reduction, a metal powder, for example, an iron powder with a spongy and filament-like microstructure having the desired properties.

Hence the oxalate precursors, such as $FeC_2O_4, 2H_2O$, with ovoid, parallelepiped or octahedral morphology or in the shape of small rods, have been shown, on reduction, to give metal powders, for example iron powders that do not meet the specifications.

Similarly, oxalate precursors with needle-like morphology, but of a size which is too far from the range specified according to the invention, for example, greater than 10 µm, more precisely from 15 to 20 µm, or less than 1 µm, do not permit one to obtain, following reduction, a metal powder, for example, a suitable iron powder.

The second stage of the method according to the invention is a thermal reduction, through treatment with gaseous hydrogen, of the metal oxalate, for example ferrous oxalate, obtained following the first step.

As has been indicated above, this reduction of the metal oxalate, for example, ferrous oxalate, with gaseous hydrogen, is generally carried out at a temperature of from 500 to 700° C., preferably at a temperature of from 520 to 620° C., more preferably from 520° C. to 580° C. In particular, this temperature depends on the metal involved.

Such a temperature has been shown, in a surprising way, to give the best results, notably with regard to the microstructure of the powder, the agglomeration of the particles of metal powder, for example iron powder, and the metal content, for example the elemental iron content.

This temperature is preferably maintained for a period of from 1 to 3 hours, more preferably 2 hours.

Also preferably, according to the invention, it has been demonstrated that the best results, notably with regard to the metal content, for example the elemental iron content, and with regard to the microstructure of the metal powder, for example the iron powder, have been obtained by observing the following thermal cycle during the thermal reduction of the oxalate precursor—the metal oxalate, for example, ferrous oxalate:

first of all, a first temperature level of from 120° C. to 150° C. is observed for a period of 3 to 5 hours, so as to encourage the loss of water molecules contained in the oxalates and to avoid the formation of a large quantity of magnetite, namely generally greater than 4%, during the thermal reduction treatment;

next, a rapid increase in temperature is brought about up to the reduction temperature indicated above, preferably 520° C.

By a rapid increase in temperature, one understands an increase in temperature at a rate of, for example, from 3 to 5° C./minute.

This rapid increase in temperature enables one to facilitate the sudden loss of the gases arising from the decomposition of the metal oxalate, for example ferrous oxalate into metal, for example metallic iron and to encourage the formation of the spongy microstructure desired.

Then a second stage at said reduction temperature is observed for a period of from 1 to 3 hours, for example, 2 hours.

Subsequently, a return to ambient temperature is brought about through natural cooling.

The metal powder, for example the iron powder obtained by reduction of the specific oxalate precursor with needle-like morphology of the invention, under the preferred reduction conditions, equally specific, of the invention, has led to obtaining a metal powder, for example an iron powder formed as agglomerates of particles the size of which is generally from 10 to 50 $\mu$m, preferably 30 to 50 $\mu$m.

This easily compactable powder is characterized by a spongy and filament-like microstructure.

This structure has been revealed by observation using a scanning electron microscope. For example, in the case of iron powder, this iron powder has been shown to have a structure similar to that of the NX 1000 iron powder.

This powder additionally has the physical and chemical properties mentioned above, which meet the specifications demanded for such an iron powder and which to a large extent exceed them.

Similarly, the characteristics and the properties of the powder according to the invention are, furthermore, for the most part, better than those measured for the NX 1000 powder.

As has already been mentioned above, the metal powder according to the invention, can be used in numerous industrial fields. Hence, the iron powder according to the invention is particularly suitable for the production of ferromagnetic compacts, used, for example, for the manufacture of armatures for small electric motors and metal components of complex shape.

In this use, the iron powder is simply shaped either by a simple pressing operation in a die, the geometry of which fixes the shape of the final component, or by a pressing operation followed by sintering in a reducing or neutral atmosphere.

The forming conditions (compaction pressure, sintering temperature and time) then fix the mechanical characteristics of the final component.

In particular, they confer on it a more or less high resistance to fracture by bending and ductile or fragile behavior when close to the point of fracture.

When the iron powder according to the invention is used in a heating pyrotechnic composition for thermo-piles, it has been seen that the composition is generally compacted, pressed or tabletted so as to obtain tablets with a density generally from 3.2 to 3.8.

These tablets are used in the thermo-pile. Such tablets are obtained in the traditional way using a press suitable for the purpose at a pressure less than that required to obtain tablets or compacts of comparable density and of lower mechanical strength with NX 1000 powder.

This is one of the effects and essential supplementary advantages for the metal powder, for example, the iron powder according to the invention and therefore notably for the pyrotechnic compositions which include this powder, which can be easily compacted.

Furthermore, the tablets or compacts obtained from the metal powder, for example, from the iron powder according to the invention, are, in a surprising way, more flexible and more resistant to handling than the same tablets or compacts obtained with metal powders of the prior art, in particular the iron powder NX 1000, the tablets according to the invention are much more resistant to impact than the tablets based on metal powder of the prior art, for example, tablets based on NX 1000 iron powder.

To put it another way, the tablets according to the invention have mechanical strength properties that are markedly improved in comparison with tablets prepared with metal powders of the prior art, for example, with iron powder NX 1000.

The tablets or compacts described above comprising the heating pyrotechnic composition according to the invention are used in a thermo-pile.

Figure 1:
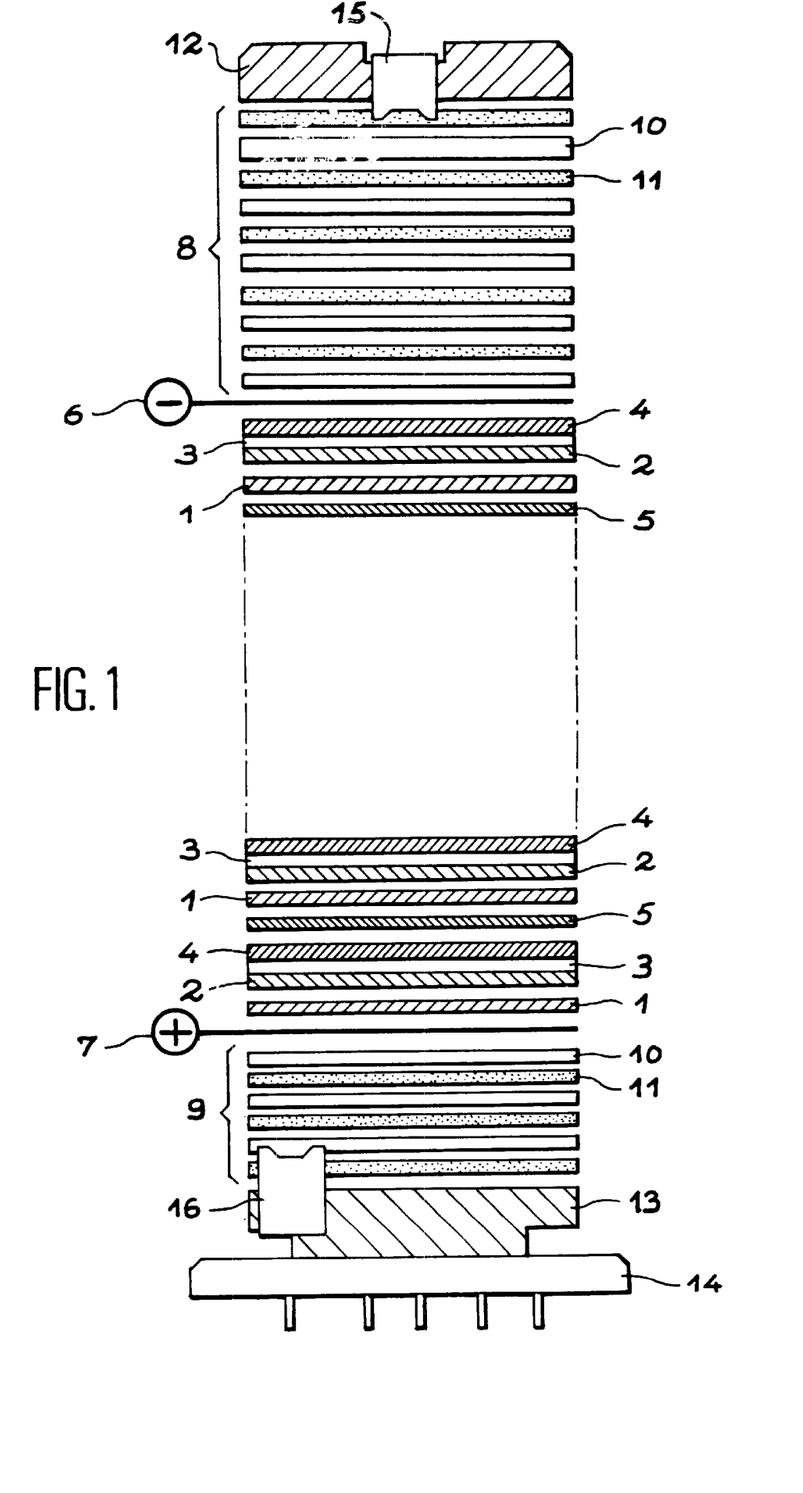
FIG. 1 represents a diagrammatic view in vertical section of a thermo-pile using the tabletted heating pyrotechnic composition according to the invention.

An example of a thermo-pile in which the tabletted heating pyrotechnic composition according to the invention can be used, is described diagrammatically in FIG. 1.

The pile can, for example, have a diameter of 34 mm and a length of 82 mm, but other dimensions could be envisaged depending on the application of the thermo-pile.

The thermo-pile comprises stacked active elements, the number of which is a function of the voltage that one wishes to obtain while the height and diameter define the current supplied by the pile.

Each of the elements is made up of a tablet of heating composition 1, a cathode 2, an electrolyte 3 and an anode 4.

The heating composition can, for example, be made up of 84% iron powder according to the invention and 16% of $KClO_4$.

Each of the elements is separated from the next element by a separator 5, for example made of steel.

On each side of the stack a fixing and a thermal guard 8, 9, are provided, formed by a certain number of elements 10, 11, made for example of an insulating ceramic.

The assembly formed by the stack of active elements is position between an upper packing piece 12 and a lower packing piece 14 fitted with a grommet assembly 13 and is held in position by flanges 15, 16.

The invention will now be described making reference to the following examples given for illustrative purposes only and being non-limitative.

The following examples 1 to 3 illustrate the production of compacts based on metallic iron powder.

EXAMPLE 1 a1) Synthesis of the Oxalate Precursor

A solution A (1 mol.l$^{-1}$) is prepared by mixing the following:

$FeCl_2$, $4H_2O$ (>99%): 198.80 g;

demineralized $H_2O$: 970 ml;

HCl 36% vol.: 30 ml.

A solution B (0.5 mol.l$^{-1}$) is also prepared by mixing the following:

$H_2C_2O_4$, $2H_2O$ (>99%): 126.20 g;

95% ethanol: 1600 ml;

demineralized $H_2O$: 390 ml;

HCl 36% vol.: 10 ml.

Then solution A is added to solution B at the rate of 0.5 l/h.

The precipitation is carried out at ambient temperature and the precipitate is left to mature at ambient temperature for 15 minutes, followed by filtration, washing with demineralized water and drying of the precipitate between 50 and 90° C.

b1) Synthesis of the Iron Powder

After sieving on a sieve with an opening diameter of 250 μm, the ferrous oxalate is subjected to reduction in pure hydrogen.

The thermal cycle used is as follows:

an increase at 500° C./h from ambient temperature to 120° C.;

temperature maintained at 120° C. for five hours;

an increase at 300° C./h from 120° C. to 520° C.;

temperature maintained at 520° C. for two hours;

a decrease at 300° C./h from 520° C. to 50° C.

c1) Synthesis of the Metal Compact

Uniaxial cold compaction of the iron powder is carried out at a forming pressure of 292 MPa, to form bars 5 to 6 mm thick, 13.3 mm wide and 32.4 mm long.

The mechanical strength measured using the three point bending test is 37 MPa, the percentage densification being 69.7%.

EXAMPLE 2 a2) Synthesis of the Oxalate Precursor

A solution A (1 mol.l$^{-1}$) is prepared by mixing the following:

$FeCl_2$, $4H_2O$ (>99%): 198.80 g;

demineralized $H_2O$: 950 ml;

HCl 36% vol.: 50 ml;

A solution B (1 mol.l$^{-1}$) is also prepared by mixing the following:

$H_2C_2O_4.2H_2O$ (>99%): 126.20 g;

95% ethanol: 800 ml;

demineralized $H_2O$: 190 ml;

HCl 36% vol.: 10 ml.

Then solution A is added to solution B at the rate of 0.5 l/h.

The precipitation is carried out at ambient temperature and the precipitate is left to mature at ambient temperature for 15 minutes, followed by filtration, washing with demineralized water and drying of the precipitate between 50 and 90° C.

b2) Synthesis of the Iron Powder

The thermal reduction treatment carried out on the ferrous oxalate with pure hydrogen, in example 2 is identical to that used in example 1.

c2) Synthesis of the Metal Compact

Uniaxial cold compaction of the iron powder is carried out at a forming pressure of 292 MPa, in the same way as in example 1.

The mechanical strength measured using the three point bending test is 44 MPa, the percentage densification being 67.8%.

EXAMPLE 3 a3) Synthesis of the Oxalate Precursor

A solution A (1 mol.l$^{-1}$) is prepared by mixing the following:

$FeCl_2$, $4H_2O$ (>99%): 198.80 g;

ethanol 95%=475 ml;

demineralized $H_2O$: 475 ml;

HCl 36% vol.: 50 ml.

A solution B (0.2 mol.l$^{-1}$) is also prepared by mixing the following:

$H_2C_2O_4.2H_2O$ (>99%): 126.20 g;

95% ethanol: 4950 ml;

HCl 36% vol.: 50 ml.

Then solution A is added to solution B at the rate of 0.5 l/h.

The precipitation is carried out at ambient temperature and the precipitate is left to mature at ambient temperature for 15 minutes, followed by filtration, washing with demineralized water and drying of the precipitate between 50 and 90° C.

b3) Synthesis of the Iron Powder

After sieving on a sieve with an opening diameter of 250 μm, the ferrous oxalate is subjected to reduction in pure hydrogen.

The thermal cycle used is as follows:

an increase at 500° C./h from ambient temperature to a temperature $T_1$, such that 120° C.$\leq T_1 \leq$150° C.;

temperature maintained at 120° C.$\leq T_1 \leq$150° C. for 3 to 5 hours;

an increase at 300° C./h from 120° C.$\leq T_1 \leq$150° C. to a temperature $T_2$, such that 520° C.$\leq T_2 \leq$620° C.;

temperature maintained at 520° C.$\leq T_2 \leq$620° C. for two hours;

a decrease at 300° C./h from 520° C.$\leq T_2 \leq$620° C. to 50° C.

c3) Synthesis of the Metal Compact

Uniaxial cold compaction of the iron powder is carried out at a forming pressure of 292 MPa.

The mechanical strength measured using the three point bending test is 60 MPa, the percentage densification being 68%.

Example 4 which follows, illustrates the production of compacts based on metallic nickel powder.

EXAMPLE 4 a) Synthesis of the Oxalate Precursor

A solution A (0.5 mol.l$^{-1}$) is prepared by mixing the following:

$NiCl_2$, $6H_2O$ (>99%): 47.50 g;

demineralized $H_2O$: 400 ml;

A solution B (0.2 mol.l$^{-1}$) is also prepared by mixing the following:

$H_2C_2O_4$, $2H_2O$ (>99%): 25.20 g;

95% ethanol: 250 ml;

demineralized $H_2O$: 750 ml.

Solution A is added to solution B at the rate of 1.6 l/h.

The temperature of the reaction medium is 90° C.

The precipitate is allowed to mature for 5 minutes at 90° C.

Then the precipitate is filtered, washed with demineralized water and dried between 50 and 90° C.

b) Synthesis of the Nickel Powder

After sieving on a sieve with an opening diameter of 250 μm, the nickel oxalate is subjected to reduction in pure hydrogen.

The thermal cycle used:

an increase at 500° C./h from ambient temperature to 150° C.;

temperature maintained at 150° C. for 3 hours;

an increase at 300° C./h from 150° C. to 420° C.;

temperature maintained at 420° C. for two hours;

a decrease at 300° C./h from 420° C. to 50° C.

c) Synthesis of the Metal Compact

Uniaxial cold compaction of the nickel powder is carried out at a pressure of 292 MPa.

The mechanical strength measured using the three point bending test is 46 MPa, the percentage densification being 60.6%.

Example 5 which follows, illustrates the production of compacts based on metallic cobalt powder.

EXAMPLE 5 a) Synthesis of the Oxalate Precursor

A solution A (1 mol.l$^{-1}$) is prepared by mixing the following:

CoCl$_2$, 6H$_2$O (>99%): 237.90 g;

95% ethanol: 475 ml;

demineralized H$_2$O: 475 ml;

HCl 36% vol.: 50 ml.

A solution B (0.2 mol.l$^{-1}$) is also prepared by mixing the following:

H$_2$C$_2$O$_4$, 2H$_2$O (>99%): 126.20 g;

95% ethanol: 4950 ml;

HCl 36% vol.: 50 ml.

Solution A is added to solution B at the rate of 0.5 l/h.

The precipitation is carried out at ambient temperature and the precipitate is left to mature at ambient temperature for 15 minutes, followed by filtration, washing with demineralized water and drying of the precipitate between 50 and 90° C.

b) Synthesis of the Cobalt Powder

After sieving on a sieve with an opening diameter of 250 μm, the cobalt oxalate is subjected to reduction in pure hydrogen.

The thermal cycle used is as follows:

an increase at 500° C./h from ambient temperature to 150° C.;

temperature maintained at 150° C. for 3 hours;

an increase at 300° C./h from 150° C. to 520° C.;

temperature maintained at 520° C. for two hours;

a decrease at 300° C./h from 520° C. to 50° C.

c) Synthesis of the Metal Compact

Uniaxial cold compaction of the cobalt powder is carried out (pressure: 292 MPa).

The mechanical strength measured using the three point bending test is 30 MPa, the percentage densification being 60.2%.

EXAMPLE 6

Preparation and Characterization of Iron Powders According to the Invention

Several batches of powder were prepared under the conditions of the method of the invention, that is to say, from a ferrous oxalate precursor with needle-like morphology, the particle size of which is from 5 to 10 μm. This precursor was then thermally reduced with gaseous hydrogen observing the conditions of the preferred thermal cycle described above, that is to say holding the temperature between 120° C. and 150° C. for 3 to 5 hours, followed by a rapid increase, that is to say at 5° C./min to the reducing temperature of from 520° C. to 620° C. and holding this temperature for a period of two hours.

Figure 2A:
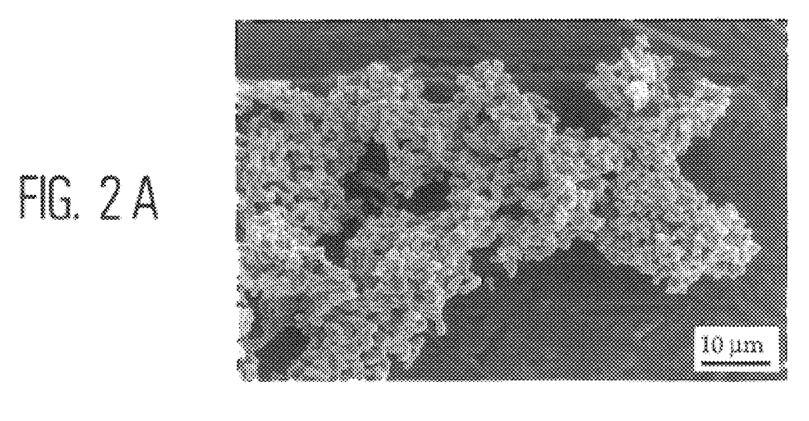
FIGS. 2A to 2C are micrographs produced with a scanning electron microscope showing the microstructure of the iron powders according to the invention.
Figure 2B:
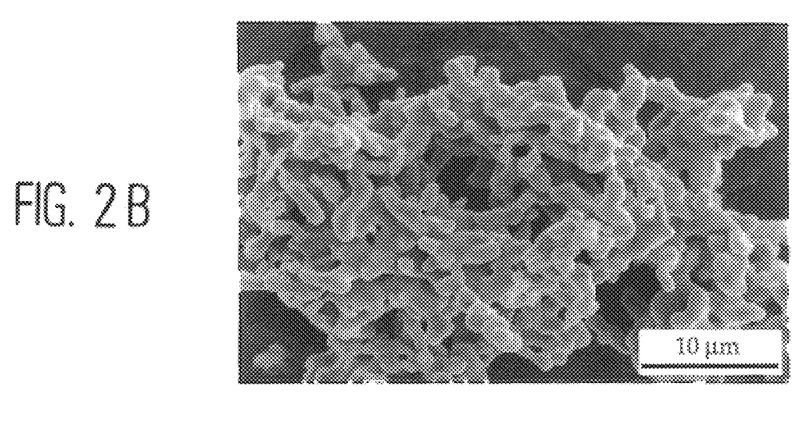
Figure 2C:
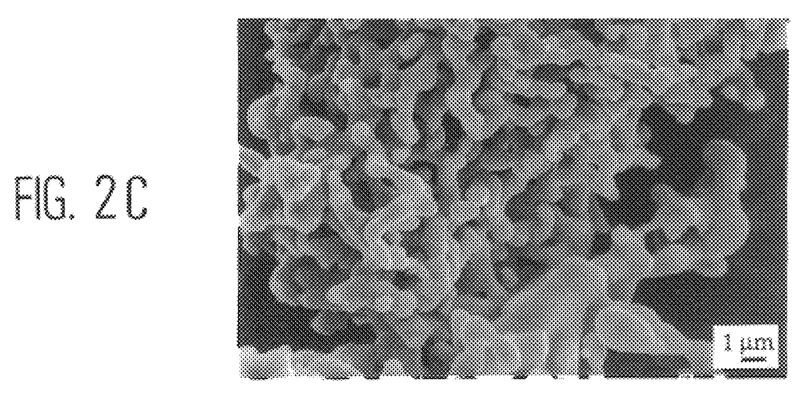
Figure 3A:
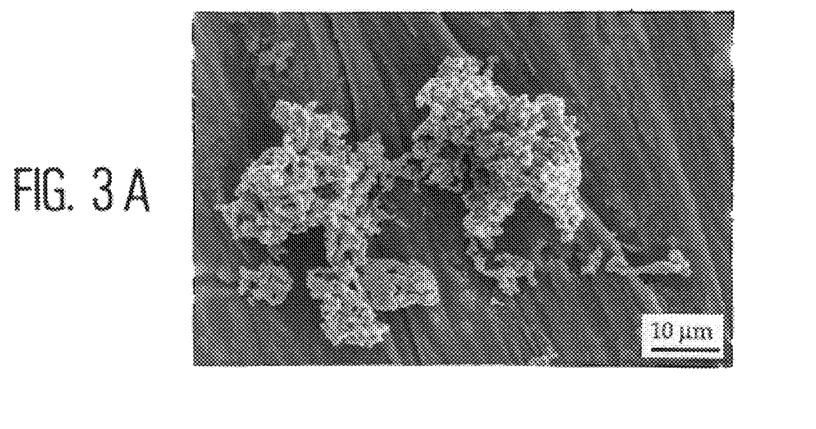
FIGS. 3A to 3C are micrographs produced with a scanning electron microscope showing the microstructure of the NX 1000 iron powders of the prior art.
Figure 3B:
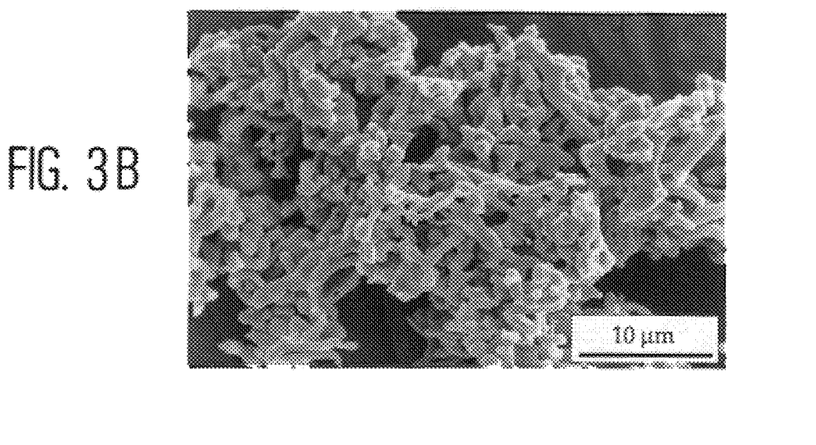
Figure 3C:
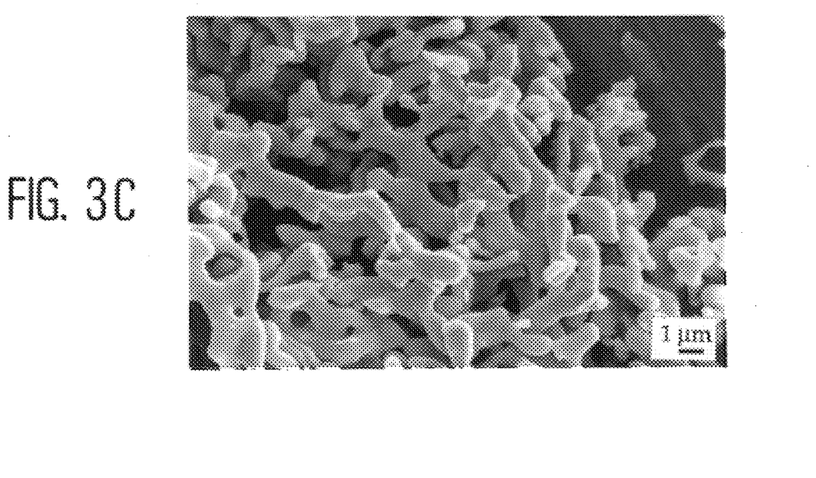

Observation with a scanning electron (MEB) microscope of the iron powders according to the invention revealed a spongy and filament-like microstructure (micrographs in FIGS. 2A, 2B and 2C) similar to that of iron powder NX 1000 of the prior art notably sold by the Company AMETEK® (micrographs in FIGS. 3A, 3B and 3C).

The physical and chemical values were then determined for the batches of powder according to the invention and these were compared with the same values measured for batches of NX 1000 iron powder, sold by the Company AMETEK®. The results of these determinations are collectively summarized in Table I.

The methods used for these determinations are as follows:

the total iron content was determined by plasma emission spectroscopy;

the elemental iron content was determined by thermogravimetric analysis (ATG) in accordance with equation (1) by knowing the increase in mass during oxidation in air of the iron powder coated with a protective layer of magnetite:

$$(1-a)\text{Fe} + a\text{Fe}_3\text{O}_4 + (3/4 + 1/2a)\text{O}_2 \rightarrow (1/2+a)\text{Fe}_2\text{O}_3 \quad (1)$$

To determine the elemental iron content, one may also use the magnetization to saturation method at ambient temperature in accordance with equation (2):

$$M_s(\text{iron powder}) = (1-a)M_s\text{Fe} + aM_s\text{Fe}_3\text{O}_4 \quad (2)$$

with M$_s$Fe=217.2 μem/g (ambient T)

and M$_s$Fe$_3$O$_4$=92.3 μem/g (ambient T)]

the loss in H$_2$ was determined by thermo-gravimetric analysis under H$_2$;

the specific surface S$_w$(m$^2$/g) which gives an indication of the state of division of the iron powder is determined by the BET method by measuring the volume of nitrogen gas necessary to form a physically adsorbed layer on the surface of the sample.

The granulometry was determined in the traditional way using automatic sieving equipment.

The resistance of the raw compact (green force) was determined in accordance with standard ASTM B312-56 T and MPIF 15 with dies and bending supports machined to these standards.

The raw compact resistances (green forces) in table I were measured on bars with a thickness between 5.5 and 6.3 mm.

TABLE I

| Iron powder | Specification | NX 1000 (measurements carried out on two batches) | Powder of the invention (means of measurements carried out on 17 batches) |
|---|---|---|---|
| Total iron (%) | >95 | 99 (±1) | 98–99 (±1) |
| Elemental iron (%) | >89 | 92.8–96.3 | 95.7–98.2 mean = 97 |
| Loss $H_2$ (%) | <3 | 1.70–2.40 | 0.26–1.30 |
| $S_w$ ($m^2/g$) | >0.5 | 0.60 | 0.50–0.90 mean = 0.58 |
| Granulometry (sieving) | <44 µm, 70% min >150 µm, 1% max | <45 µm, 70–71% >150 µm, 0.2–0.9% | <45 µm, 70.6–81% mean = 75.2% >150 µm, 0.05–1.0% mean = 0.19% |
| Sub Fischer granulometry (µm) | 1.50–3.50 | 3.20 | 3.25–3.30 |
| Green force (MPa) $P_c$ = 276 MPa | >35 | 30 | 51 |
| Green force (MPa) $P_c$ = 292 MPa | — | 34–39 mean = 37 | 51–69 mean = 60 |

It emerges from what has gone before that the investigation using the electron microscope demonstrates clearly that the spongy and filament-like microstructure of the iron powder according to the invention is close to, or indeed identical to, that of the NX 1000 powder.

Furthermore, the measured physical and chemical properties of the powder according to the invention demonstrate that the set of specifications required for use in a heating pyrotechnic composition for a thermo-pile are met and indeed are exceeded.

In effect, the total iron content is equal to 98–99% (which is markedly greater than the demands of the specification>95%).

The elemental iron content is between 95.7 and 98.2% which is markedly greater than the demands of the specification (>89%) and is also greater than the elemental iron content of powder NX 1000 which is only from 92.8 to 96.3%.

Consequently, the loss to hydrogen, between 0.26 and 1.30% is markedly less than the 3% of the specification and is also less than the value for NX 1000 powder which is from 1.70 to 2.40%.

The specific surface (0.50 to 0.90 $m^2/g$) and the granulometry determined by sieving (>150 µm : 0.05 at 1%, <45 µm: 70.6 to 81%) are kept to; the proportion of finer particles (<45 µm) being greater than that for NX 1000 powder.

Whatever the forming pressure used (276 or 292 MPa), the green force S of the iron powder according to the invention is greater than that for NX 1000 powder. Hence S=51 to 69 MPa for the powder of the invention and S=34 to 39 MPa for the NX 1000 powder at Pc=292 MPa.

These results are reproducible whatever the batch of iron powder produced according to the invention.

EXAMPLE 7

Preparation and tests of Pyrotechnic Heating Compositions a) Preparation

For purposes of comparison, two pyrotechnic heating compositions were prepared comprising 84% iron powder and 16% potassium perchlorate. The first composition includes the iron powder NX 1000 and the second composition includes the iron powder according to the invention.

b) Calorimetric Test

The calorimetry of the two compositions was tested. The results obtained are collectively given in table II below:

TABLE II

| Composition | Test 1 (cal/g) | Test 2 (cal/g) | Test 3 (cal/g) | Mean (cal/g) |
|---|---|---|---|---|
| Composition with NX 1000 iron powder | 289 | 290 | 290 | 290 |
| Composition with iron powder according to the invention | 290 | 291 | 290 | 290 |

The accuracy of the measurements is better than 1%.

Therefore, from the calorimetric point of view it is shown that the two compositions are identical.

c) Tabletting and Compaction Tests

Tabletting tests were then carried out with the two compositions described above.

So that it should be representative of the material, a reference density was taken for the two tablets prepared from each of the two compositions. This density is 3.5.

The test was carried out on diameters of 36 mm and 100 mm. The main observation was that the tablets obtained based on the powder according to the invention, were more flexible and resistant to handling or to put it another way, the tablets based on powder according to the invention were better able to resist impacts that the tablets based on NX 1000.

The pressure ratios determined on a diameter of 36 mm were again found for a diameter of 100 mm:

for the mixture including NX 1000 powder, 94 tonnes was necessary to obtain a density of 3.47;

for the mixture including the powder according to the invention, only 80 tonnes was applied to obtain the density of 3.47.

The pressure ratio was therefore established at 1.175.

The mechanical strength of the tablets produced, gave rise to the same statements as above in relation to the superiority of the tablets that include the iron powder according to the invention.

d) Measurement of the Speed of Combustion

The speed of combustion is measured in accordance with the method called the cut wires method.

The tablet placed between 2 compression plates is drilled at 2 points, 70 mm apart; 2 wires are passed through these holes.

When the heating composition is ignited, an electronic card records the time at which the wires are cut.

The results obtained respectively by the heating mixture including NX 1000 powder (AMETEK® mixture) and for the heating mixture according to the invention that includes the iron powder according to the invention, are collected and summarized in tables III and IV.

TABLE III

| Tablet No. | 1 | 2 | 3 | 4 | 5 |
|---|---|---|---|---|---|
| Speed (mm/s) | 95 | 96 | 95 | 97 | 96 | mean; 96 mm/s variation 2 mm/s

TABLE IV

| Tablet No. | 1 | 2 | 3 | 4 | 5 |
|---|---|---|---|---|---|
| Speed (mm/s) | 104 | 104 | 106 | 103 | 103 | mean; 104 mm/s variation 3 mm/s

Therefore, a speed increased by close to 10% was recorded for the tablets according to the invention.

Furthermore, the slag from the tablets produced with the mixture according to the invention retains the same mechanical strength superiority in comparison with the tablets based on NX 1000 powder; the tablets remain flexible and the fracture behavior is better.

These observations show that the better strength of the compact made with the iron powder according to the invention is found throughout the entire chain of use of the product.

EXAMPLE 8

Tests of Thermo-piles

Pile ignitions were carried out on piles which include either a pyrotechnic mixture prepared with the iron powder according to the invention and potassium perchlorate in proportions of 84/16 or a pyrotechnic mixture called the STANDARD mixture which includes NX 1000 iron powder from the company AMETEK® and potassium perchlorate in the same proportions (84/16).

This powder is pressed or tabletted so as to obtain tablets of a measured density of 3.5.

These tablets are included in the active elements of a thermo-pile such as that shown in FIG. 1. The pile chosen for the tests has a diameter of 34 mm and a length of 82 mm. This is a pile currently used with a qualified specification and which is in production.

In total 14 piles were produced.

Four of the piles were produced with the STANDARD heating pyrotechnic mixture that includes NX 1000 iron powder.

The ten other piles were produced with the heating pyrotechnic mixture according to the invention.

The 14 piles were produced in exactly the same manner and included exactly the same components.

They only differed in the iron powder used.

The first objective of the tests carried out is to check good cold ignition of the heating compositions according to the invention, that is to say a cold performance that conforms and ignition that is not erratic and which is reproducible. So as to better test this parameter, all these piles were ignited at a cold temperature that is more constraining than those usually applied, namely −60° C. in place of −40° C.

In effect, it is clear that if there is any risk of erratic ignition, a decrease in the stabilization temperature before ignition, will reveal any such problems better.

The specification relating to discharge consists of a continuous discharge through a resistance.

Figure 4:
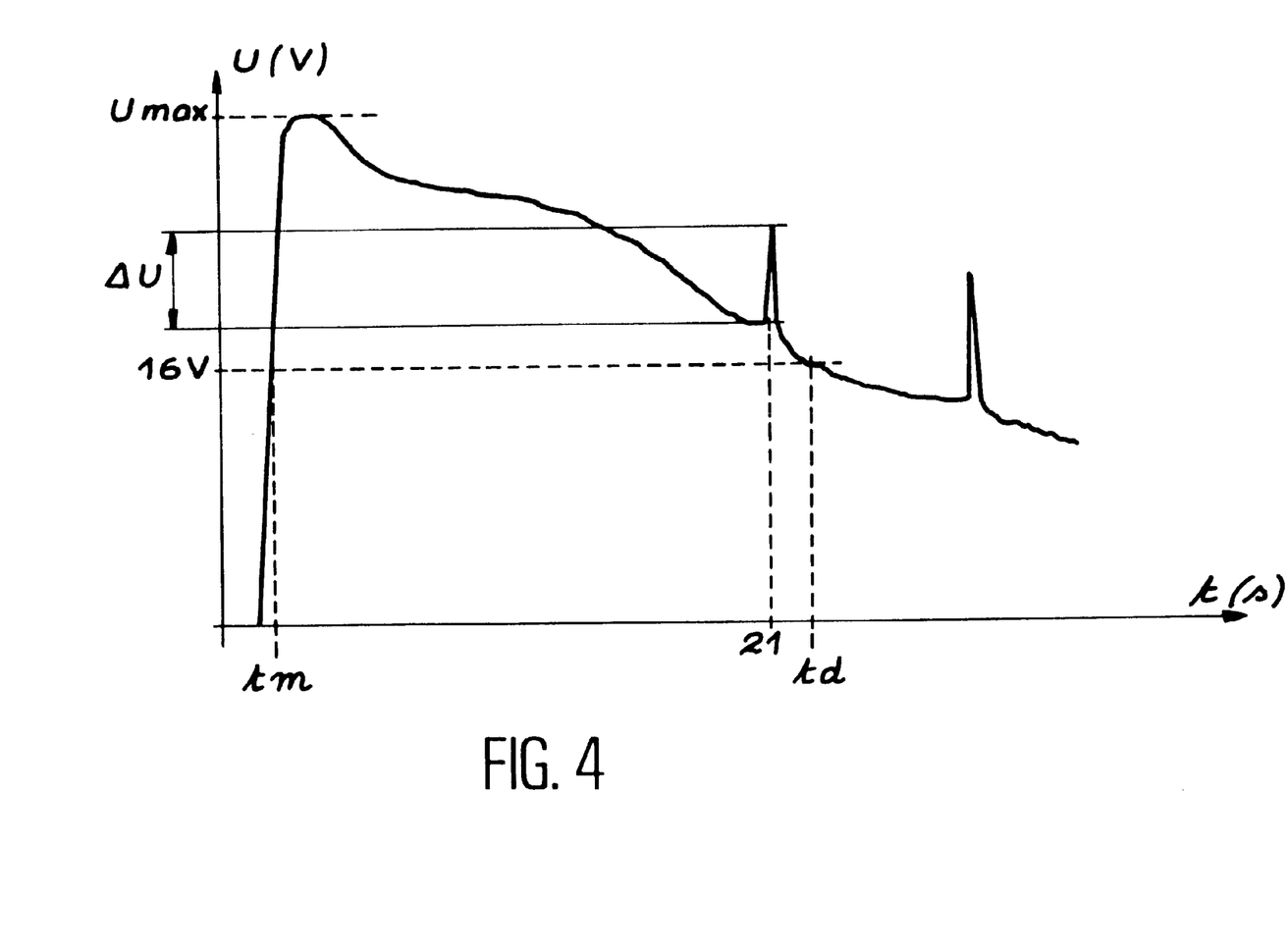
FIG. 4 is a graph showing the typical discharge curve of a thermo-pile. The voltage U (in volts) is on the x-axis and the time t (in seconds) on the y-axis.

The parameters noted during the tests are summarized on the graph in FIG. 4 which gives the discharge curve typical of a thermo-pile where the voltage U (volts) is shown as a function of the time t (seconds).

The parameters are the following:

rise time to 16 V (or initiation time): $t_m$ (s)

maximum voltage: $U_{max}$ (V)

decay time at 16V: $t_d$ (s)

internal resistance at 21 s: Ri (Ω)

The internal resistance Ri (Ω) at 21 s at the time the circuit is opened is determined by $\Delta U = R \Delta I$ (see FIG. 4).

The results obtained with the piles according to the invention (1–10) and the piles including the "standard" mixture (11–14) are collectively summarized in table V below:

| Pile No. | $t_m$ | $U_{max}$ (V) | $t_d$ (s) | Ri (Ω) |
|---|---|---|---|---|
| 1 | 0.317 | 20.85 | 21.6 | 0.77 |
| 2 | 0.253 | 20.84 | 21.7 | 0.76 |
| 3 | 0.271 | 20.83 | 21.4 | 0.82 |
| 4 | 0.255 | 20.94 | 23.2 | 0.56 |
| 5 | 0.264 | 20.84 | 23 | 0.57 |
| 6 | 0.284 | 20.64 | 20 | 0.99 |
| 7 | 0.257 | 20.96 | 22.9 | 0.59 |
| 8 | 0.268 | 20.91 | 23.1 | 0.57 |
| 9 | 0.3 | 20.62 | 20.6 | 0.88 |
| 10 | 0.257 | 20.01 | 23.4 | 0.54 |
| 11 | 0.252 | 20.76 | 23.8 | 0.58 |
| 12 | 0.245 | 20.95 | 24 | 0.48 |
| 13 | 0.242 | 21.01 | 25.5 | 0.4 |
| 14 | 0.25 | 20.23 | 24.7 | 0.53 |

Analysis of the Results

Initiation Times (Rise Time to 16 V)

These are identical. There were no erratic starts, the voltage rise proceeded in a satisfactory fashion and the scatter observed was not significant.

Internal Resistance at 21 Seconds

The results were more scattered

Maximum Voltage

The scatter was quite small (<4%) and not significant between the "standard" piles (11 to 14) and the piles according to the invention (1 to 10).

Decay Time at 16V

The scatter appeared once again and is linked to the internal resistance values.

In conclusion, the small differences in the ignition time and the maximum voltage show that the combustion of the heating compositions takes place in an identical fashion.

With regard to the scatter in the values of the decay time at 16 V, and the internal resistance at 21 s, the cause of these results is attributable to the manufacturing parameters and more precisely to the effective mass of the heating tablets which varies more for the tablets according to the invention.

This shows the highly relative nature of the scatter observed for the decay time and the internal resistance, the more so for a pile design developed for a duration of 20 seconds at −10° C. All the piles tested would conform at −60° C.

All of the results that relate to the tests on the piles are extremely satisfactory and demonstrate that the so-called STANDARD piles produced with the AMETEK® pyrotechnic mixture are comparable to those of the invention.

What is claimed is:

1. A method of preparing a metal or metal alloy powder comprising the following steps:
   synthesizing a simple or mixed metal oxalate of one or more metals, made up of particles with needle-like morphology, having a mean acicularity ratio (length/diameter) of from 4 to 20, and a length of from 5 to 10 μm;
   separating said metal oxalate;
   converting said metal oxalate to said metal or metal alloy powder by reducing treatment with gaseous hydrogen.

2. The method according to claim 1 wherein converting said metal oxalate comprises decomposition of said oxalate, in air, to an oxide followed then by reduction of said oxide.

3. The method according to claim 1, wherein said metal is selected from the group consisting of transition metals and rare earth metals.

4. The method according to claim 3, wherein said metal is selected from the group consisting of iron, cobalt and nickel.

5. The method according to claim 1, wherein said metal oxalate is produced by mixing a solution of a metal salt and a solution of an oxalic compound and precipitating the metal oxalate from this mixture.

6. The method according to claim 5, wherein said metal oxalate is ferrous oxalate.

7. The method according to claim 5, wherein said metal salt is a chloride of said metal.

8. The method according to claim 7, wherein said metal salt is ferrous chloride tetrahydrate $FeCl_2.4H_2O$.

9. The method according to claim 5, wherein said metal salt is a metal sulfate.

10. The method according to claim 9, wherein said metal salt is ferrous sulfate.

11. The method according to claim 5, wherein the concentration of metal salt in the mixture is from 0.5 to 2 mol./l.

12. The method according to claim 5, wherein the solution of metal salt is a solution in a solvent selected from the group consisting of water, ethanol, isopropanol, polyols, glycerol, ethylene glycol, 1,2-propanediol and mixtures thereof.

13. The method according to claim 5, wherein said oxalic compound is a dihydrate complex of oxalic acid of formula $H_2C_2O_4.2H_2O$.

14. The method according to claim 5, in wich the concentration of the oxalic compound in said mixture is from 0.2 to 2 mol./l.

15. The method according to claim 5, wherein the solution of the oxalic compound is a solution in a solvent selected from the group consisting of water, ethanol, isopropanol, polyols, glycerol, ethylene glycol, 1,2-propanediol and mixtures thereof.

16. The method according to claim 5, wherein the precipitation is carried out at a temperature between 15 and 30° C.

17. The method according to claim 5, wherein after the precipitation, the precipitated metal oxalate is additionally subjected to one or more successive operations of maturation, separation, washing, drying and sieving.

18. The method according to claim 1, wherein said reduction is carried out at a temperature of from 500 to 700° C.

19. The method according to claim 18, wherein the reduction is carried out in accordance with the following thermal cycle:
   maintaining a first temperature level of from 120° C. to 150° C. for a period of 3 to 5 hours;
   rapidly increasing the temperature level to about the reducing temperature;
   maintaining a second temperature level, at said reducing temperature for a period of from 1 to 3 hours.

20. The method according to claim 19, wherein the reducing temperature is 520° C. and the second temperature level is held for period of 2 hours.

21. The method according to claim 1, wherein said reduction is carried out at a temperature of from 520 to 620° C. for a period of from 1 to 3 hours.

22. The method according to claim 11, wherein said reduction is carried out at a temperature of from 520 to 580° C.

23. The method according to claim 2, wherein the decomposition of the oxalate, in air, is carried out at a temperature of from 250 to 600° C.

24. A compact prepared by the process comprising
   preparing a metal or metal alloy powder comprising the following steps:
      synthesizing a simple or mixed metal oxalate of one or more metals, made up of particles with needle-like morphology, having a mean acicularity ratio (length/diameter) of from 4 to 20, and a length of from 5 to 10 μm;
      separating said metal oxalate;
      converting said metal oxalate to said metal or metal alloy powder by reducing treatment with gaseous hydrogen, and wherein said metal oxalate is optionally decomposed in air to an oxide, followed by reduction of said oxide; and
   pressing said metal or metal alloy powder.

25. The compact according to claim 24, wherein one or more supplementary compounds are added to said at least one metal or alloy powder.

26. The compact according to claim 25, wherein one ore more said compounds are selected from the group consisting of ceramics, ionic compounds, hydrides, oxides, ferromagnetic metals, hydroxides, and aliphatic or cyclic organic liquid compounds.

27. The compact according to claim 24, wherein said pressing is carried out at a compaction pressure of from 50 to 500 MPa.

28. The compact according to claim 24, wherein said pressing is carried out at a compaction pressure of from 500 to 1000 Mpa.

29. The compact according to claim 24, further comprising a partial sintering of said metal or metal allow during or after the pressing.

30. The compact according to claim 29, wherein said partial sintering is carried out under a reducing or neutral atmosphere.

31. The compact according to claim 29, wherein said partial sintering is carried out at a temperature of from 400 to 600° C.

32. A metal or metal alloy powder made up of spongy and filament-like particles prepared by the method according to claim 1.

33. The metal or metal alloy powder according to claim 32, wherein said particles have a size between 10 and 50 μm.

34. The metal or metal alloy powder made up of spongy and filament-like particles prepared by the method according to claim 20.

35. An iron powder having a spongy and filament-like microstructure and having the following properties:

total iron content: greater than or equal to 98%;

elemental iron content: greater than or equal to 95.7%;

loss to hydrogen: less than or equal to 1.3%;

specific surface: greater than or equal to 0.50 m²/g;

sub Fischer granulometry : 3.25 to 3.5 μm;

more than 70% of particles having a size less than 45 μm;

less than 1% of particles with a size greater than 150 μm;

Green force (resistance of the raw compact) from a forming pressure of 276 Mpa: equal to or greater than 50 MPa.

36. A compact formed by pressing the iron powder according to claim 35.

37. The compact according to claim 36, wherein one or more supplementary compounds are added to said iron powder.

38. The compact according to claim 37, wherein one ore more said compounds are selected from the group consisting of ceramics, ionic compounds, hydrides, oxides, ferro-magnetic metals, hydroxides, and aliphatic or cyclic organic liquid compounds.

39. The compact according to claim 36, wherein said pressing is carried out at a compaction pressure of from 50 to 500 MPa.

40. The compact according to claim 36, wherein pressing is carried out at a compaction pressure of from 500 to 1000 Mpa.

41. The compact according to claim 36, wherein additionally a partial sintering is carried out during or after the pressing.

42. The compact according to claim 41, wherein said partial sintering is carried out under a reducing or neutral atmosphere.

43. The compact according to claim 42, wherein said partial sintering is carried out at a temperature of from 400 to 600° C.

44. Soft or hard (ferro)-magnetic material comprising the compact according to claim 24.

45. Porous electrode comprising the compact according to claim 24.

46. Catalyst support comprising the compact according to claim 24.

47. Mechanical component comprising the compact according to claim 24.

48. Heating pyrotechnic composition comprising the metal powder according to claim 32.

49. The heating pyrotechnic composition according to claim 48, comprising an oxidizing agent selected from the group consisting of potassium perchlorate, lead dioxide, tungsten oxide and iron oxide, in a proportion by weight of from 80 to 88% of metal powder to 12 to 20% of oxidizing agent.

50. The heating pyrotechnic composition according to claim 49, made up of 84% by weight of metal powder and 16% by weight of potassium perchlorate.

51. Tablet of a heating pyrotechnic composition according to claim 49 which has an apparent density of from 3.2 to 3.8.

52. Thermo-pile comprising tablets according to claim 51.

53. Soft or hard (ferro)-magnetic material comprising the compact according to claim 36.

54. Porous electrode comprising the compact according to claim 36.

55. Catalyst support comprising the compact according to claim 36.

56. Mechanical component comprising the compact according to claim 36.

57. Heating pyrotechnic composition comprising the iron powder according to claim 35.

58. The heating pyrotechnic composition according to claim 57, comprising an oxidizing agent selected from the group consisting of potassium perchlorate, lead dioxide, tungsten oxide and iron oxide, in a proportion by weight of from 80 to 88% of iron powder to 12 to 20% of oxidizing agent.

59. The method according to claim 5, wherein the solution of metal salt is a solution in a solvent selected from the group consisting of water, alcohols having from 1 to 4 carbon atoms, and mixtures thereof.

60. The method according to claim 5, wherein the solution of the oxalic compound is a solution in a solvent selected from the group consisting of water, alcohols having from 1 to 4 carbon atoms, and mixtures thereof.

* * * * *